United States Patent [19]
Ohtsuka et al.

[11] Patent Number: 5,598,092
[45] Date of Patent: Jan. 28, 1997

[54] DC-DC CONVERTER

[75] Inventors: Masanori Ohtsuka, Yokohama; Kazunari Kitani, Kawasaki, both of Japan

[73] Assignee: Canon Kabushiki Kaisha, Tokyo, Japan

[21] Appl. No.: 255,984

[22] Filed: Jun. 8, 1994

[30] Foreign Application Priority Data

Jun. 10, 1993 [JP] Japan .................... 5-138573

[51] Int. Cl.⁶ ............................ G05F 1/656
[52] U.S. Cl. ........................................ 323/222
[58] Field of Search ............................ 323/222, 282, 323/908; 363/19, 21

[56] References Cited

U.S. PATENT DOCUMENTS

| | | | |
|---|---|---|---|
| 5,097,196 | 3/1992 | Schoneman | 323/222 |
| 5,122,724 | 6/1992 | Criss | 323/222 |
| 5,180,964 | 1/1993 | Ewing | 323/222 |
| 5,313,383 | 5/1994 | Ikeuci | 363/21 |
| 5,350,997 | 9/1994 | Ghotbi et al. | 323/268 |
| 5,457,379 | 10/1995 | Jacobs | 323/222 |
| 5,463,306 | 10/1995 | Berry et al. | 323/222 |

*Primary Examiner*—Matthew V. Nguyen
*Attorney, Agent, or Firm*—Fitzpatrick, Cella, Harper & Scinto

[57] ABSTRACT

In a current mode DC-DC converter, the current flowing through a coil is switched and an output characteristic is controlled. The output of the converter is detected and the current flowing through the coil is limited according to the detected output only when the detected output is larger than a predetermined value to reduce the start-up time and improve output voltage regulation.

6 Claims, 10 Drawing Sheets

DC-DC CONVERTER

BACKGROUND OF THE INVENTION

1. Field of the Invention

This invention relates to a DC-DC converter for obtaining a predetermined voltage from a direct current power source such as a battery.

2. Description of the Related Art

DC-DC converters have been used widely in systems having a battery or a direct current power supply. FIG. 10 shows an example of a DC-DC converter for use in such systems, which is a boosting type DC-DC converter. A coil 2 and a switching device 5 are connected in series to a power source 1. An anode of a diode 3 is connected to the connection point between the coil 2 and the switching device 5, and a capacitor 4 is connected between a cathode of the diode 3 and a minus terminal of the power source 1. In this DC-DC converter, when the switching device 5 is turned on, a current flows through the power source 1, the coil 2 and the switching device 5. When the switching device 5 is turned off, a current flows through the power source 1, the coil 2, the diode 3 and the capacitor 4. Energy is thereby accumulated in the capacitor 4. This operation is repeated until an output voltage becomes equal to a predetermined voltage. When the predetermined voltage is reached, this operation is stopped. Thereafter, when the output voltage is reduced to a certain level, the operation is repeated again. The output voltage is thereby maintained substantially constantly.

In this kind of DC-DC converter, switching of the switching device is determined depending upon the output voltage. Therefore, it is difficult to anticipate resulting variations in the power supply voltage related to the switching. For this reason, a filter circuit capable of filtering over a range from a low frequency to a high frequency is required. Such a filter circuit is complicated and expensive, requires a large mount space, and is therefore unsuitable for simple products and products designed to be smaller in size. If the filter circuit of a DC-DC converter provided in a camera or the like is simplified, it is possible that the automatic focusing accuracy will be seriously reduced and that a remote control signal or the like will be erroneously accepted or will not be accepted, resulting in failure to achieve necessary functions.

DC-DC-converters designed to solve this problem have been provided. That is, pulse width modulation (PWM) type DC-DC converters in which the on and off times of a switching device are changed according to the output voltage and current mode type DC-DC converters in which a coil current corresponding to the difference between the output voltage and a set target voltage is formed have been proposed and realized as products. In current mode type DC-DC converter among such DC-DC converters, variations in the power supply voltage can be limited particularly effectively and there is practically no need for a complicated expensive filter circuit, because the on-time can be controlled more linearly in current mode type DC-DC converters than in PWM type DC-DC converters. Further, current mode type DC-DC converters can have a current caused to flow through a coil according to the difference between the output current and a set target current, and can therefore avoid excessive current through the coil. Also, even if, for example, the coil is changed, only a section for detecting the coil current may be changed to achieve the desired performance while the same switching frequency and the same on time are maintained.

However, the rising rate of the output voltage from 0 V in current mode type DC-DC converters is lower than that in other conventional DC-DC converters, because of the configuration for causing a current corresponding to the difference between the output voltage and a set target voltage to flow through the coil. Current mode type DC-DC converters also have a drawback in that the output voltage is reduced if the load is increased with respect to a set target value, because the output voltage regulation with respect to variations in the load is such that the output voltage is determined at a point of balance between the load current and the current supplied from the coil.

SUMMARY OF THE INVENTION

In view of the above-described problems of the conventional art, it is object of the present invention to provide a current mode type DC-DC converter which is capable of limiting variations in power supply voltage, which therefore requires only a simple and low-priced power source filter, which has a short startup time and which is capable of limiting variations in output voltage even if the load changes.

The invention is directed to a DC-DC converter in which current flow through a coil is switched and an output characteristic is controlled. The output of the converter is detected and the current flowing through the coil is determined according to the detected output.

According to one aspect of the present invention, there is provided a DC-DC converter in which the operation of the DC-DC converter is limited to different conditions with respect to the state of the current flowing through a coil of the DC-DC converter as between the time when the detected output is equal to or lower than a predetermined voltage and the time when the detected output is higher than the predetermined voltage.

According to another aspect of the present invention, there is provided a DC-DC converter having a coil of a predetermined inductance, a switching unit connected in series with the coil to switch a current flowing through the coil, an accumulation unit for accumulating energy accumulated in the coil, and a coil current control unit for causing a current to flow through the coil according to the voltage corresponding to the energy accumulated by the accumulation unit. The DC-DC converter includes an inhibition unit for inhibiting the coil current control unit from performing a coil current control when the voltage corresponding to the energy accumulated in the accumulation unit is lower than a predetermined voltage. The coil current is thereby controlled and determined.

These and other objects, features and advantages of the present invention will become apparent from the following description of preferred embodiments of the invention taken in conjunction with the accompanying drawings.

DESCRIPTION OF THE PREFERRED EMBODIMENT

Figure 1:
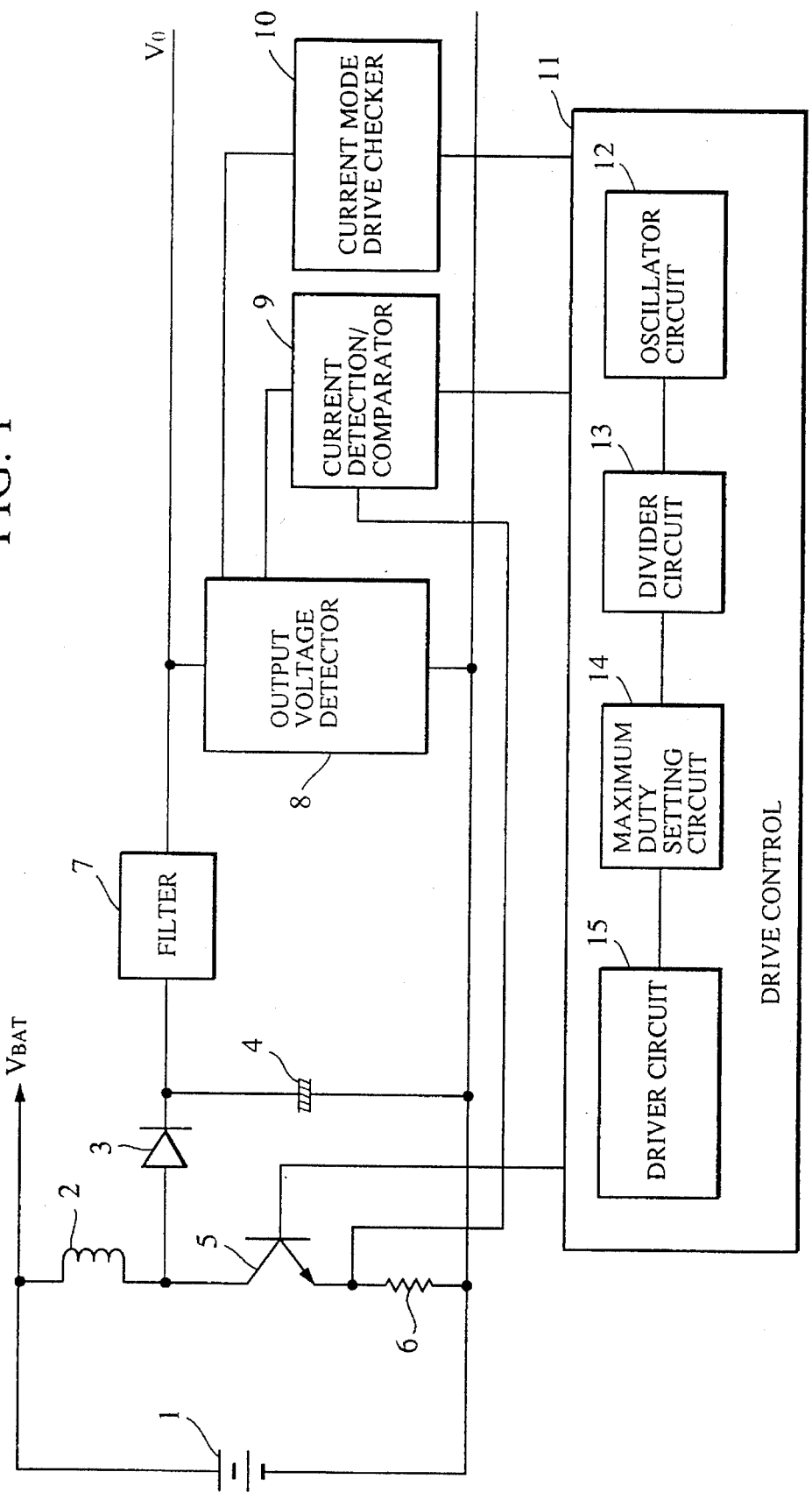
FIG. 1 is a block diagram of a DC-DC converter in accordance with an embodiment of the present invention.

FIG. 1 is a block diagram of a DC-DC converter in accordance with a first embodiment of the present invention, showing essential features of the invention. The DC-DC converter has a battery 1, i.e., a power source, a coil 2 having a predetermined inductance and having one end connected to the battery 1, a reverse current checking diode 3 connected to the other end of the coil 2, a capacitor 4 connected to a cathode of the diode 3, a switching transistor 5 for switching a line connecting the coil 2 to ground, a resistor 6 for detecting a current flowing through the switching transistor 5, a filter 7 connected to the diode 3 and the capacitor 4 to smooth an output voltage $V_O$, an output voltage detector 8 for detecting the output voltage $V_O$, and a current detection/comparator 9 which receives a signal from the output voltage detector 8. The current detection/comparator 9 converts the difference between a target output voltage and the actual output voltage into a maximum allowable current and determines whether or not the output from the current detection resistor 6 is larger than the maximum allowable current. The DC-DC converter also has a current mode drive checker 10 for checking stoppage of driving the DC-DC converter caused by the current detection/comparator 9, and a drive control 11 including a DC-DC converter oscillator circuit 12, a divider circuit 13, a circuit 14 for setting a maximum duty, and a driver circuit 15 for directly driving the switching transistor 5.

Figure 2:
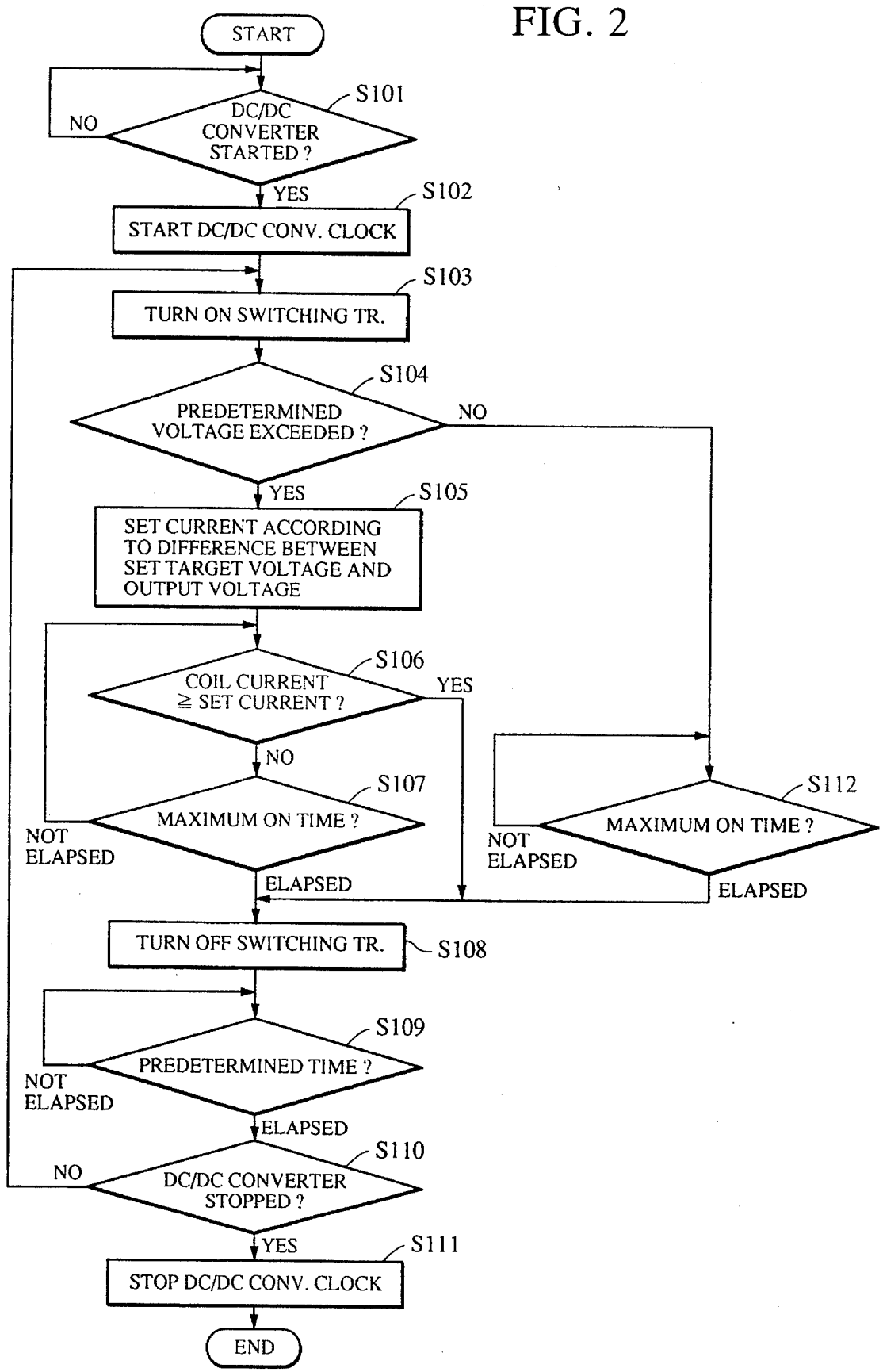
FIG. 2 is a flowchart of the operation of the DC-DC converter shown in FIG. 1.

The operation of the thus-arranged DC-DC converter will be described with reference to the flowchart of FIG. 2. A start switch (not shown) of the DC-DC converter is turned on to start the operation of the DC-DC converter (S101) and the oscillator circuit 12 in the drive control 11 starts oscillating (S102). Then the switching transistor 5 is turned on by the driver circuit 15 in response to an output from the oscillator circuit 12 supplied to the driver circuit 15 through the divider circuit 13 and the maximum duty setting circuit 14 (S103). Simultaneously, a detection is made by the output voltage detector 8 as to whether the output voltage $V_O$ of the DC-DC converter has exceeded a predetermined voltage (S104). If the output voltage $V_O$ is equal to or lower than the predetermined voltage, the process proceeds to step S112. At a time immediately after the start of the DC-DC converter, when the output voltage $V_O$ of the DC-DC converter is not higher than the predetermined voltage, the drive control 11 inhibits, by an output signal from the current mode drive checker 10, a control based on an output signal from the current detection/comparator 9. That is, it inhibits the control of steps S105 and S106 to maintain the on state of the switching transistor 5 for a maximum on time determined by the maximum duty setting circuit 14 (S112).

In this state, as a current I flowing through the coil, a rush current flows generally in accordance with the following equation:

$$I = (V_{BAT}/L) \times t_{ON} \quad (1)$$

where I is the coil current, L is the inductance of the coil, $V_{BAT}$ is the power source voltage, and $t_{ON}$ is the period of time through which the switching transistor is on. The current value increases gradually in proportion to the on-time from the time when the switching transistor is turned on.

After the elapse of the maximum on time (S112), the switching transistor 5 is turned off by the driver circuit 15 (S108). Then the coil 2 generates a current so that a current flows to the capacitor 4 through the diode 3. The output voltage is thereby increased slightly.

After the elapse of an off time predetermined by the maximum duty setting circuit 14 (S109), if the DC-DC converter is to successively continue operating (S110), the switching transistor 5 is turned on again (S103). A detection is made again by the output voltage detection circuit 8 as to whether the output voltage is higher than the predetermined voltage (S104). If the predetermined voltage is not exceeded, the same operation is repeated.

With several cycles of this operation, the output voltage $V_O$ is gradually increased. The output voltage detection circuit 8 detects whether the output voltage is higher than the predetermined voltage (S104). If the predetermined voltage is exceeded, the process then proceeds to step S105 and the inhibition of the control of the comparison means set by the checker 10 is canceled. In step S105, the difference between the present output voltage $V_O$ and a set target voltage is obtained by the current detection/comparator 9, and a maximum allowable rush current value is set according to this difference (S105). This current and the coil current (equation (1)) are compared (S106). If the coil current is smaller than the maximum allowable rush current, the process proceeds to step S107 and a determination is made as to whether the present time is within the maximum on-time set by the maximum duty setting circuit 14 (S107). If the present time is within the maximum on-time, the coil current and the maximum allowable rush current are compared again (S106). Since the coil current is proportional to $t_{ON}$ as expressed by the equation (1), it is gradually increased as this operation is repeated. If the coil current exceeds the maximum allowable rush current value (S106) or if the maximum on-time has elapsed while the maximum allowable rush current is not exceeded (S107), the switching transistor 5 is turned off (S108). Subsequently, the same operation is repeated.

As the output voltage approaches the set target voltage, the maximum allowable rush current value becomes smaller. Accordingly, before the elapse of the maximum on-time (S107), the coil current exceeds the maximum allowable rush current value (S106), and the switching transistor 5 is turned off by the corresponding signal.

Figure 3:
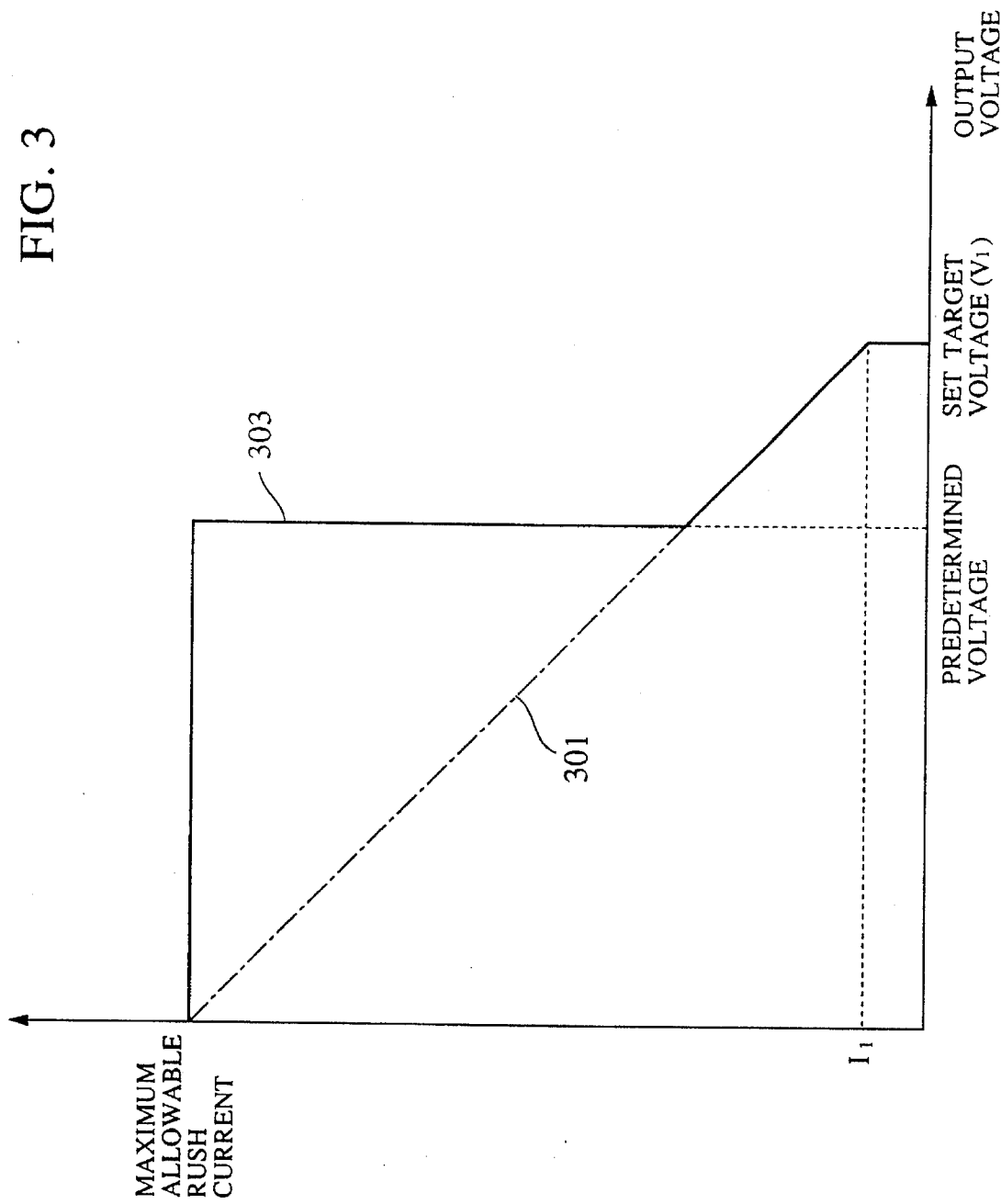
FIG. 3 is a diagram showing a correlation in accordance with the operation shown in FIG. 2.

FIG. 3 shows the relationship between the maximum allowable rush current of the current detection/comparison circuitry and the output voltage in accordance with the present invention.

The dot-dash line 301 in FIG. 3 represents a correlation line of the conventional current mode type DC-DC converter, while the solid line 303 represents a correlation line of the present invention. Before the predetermined voltage is reached, the current mode DC-DC converter control is not performed, as can be understood from this relationship diagram, and the maximum coil current therefore flows as the current expressed by the equation (1). Accordingly, the current caused when the switching transistor 5 is turned off is larger than that in the conventional current mode type DC-DC converter, so that a faster rise time can be achieved. When the output voltage becomes higher than the predetermined voltage, the same operation as that of the ordinary DC-DC converter is performed and the operation can be finely controlled. It is therefore possible to effectively reduce ripples or to use only simple and low-priced filters.

Figure 4:
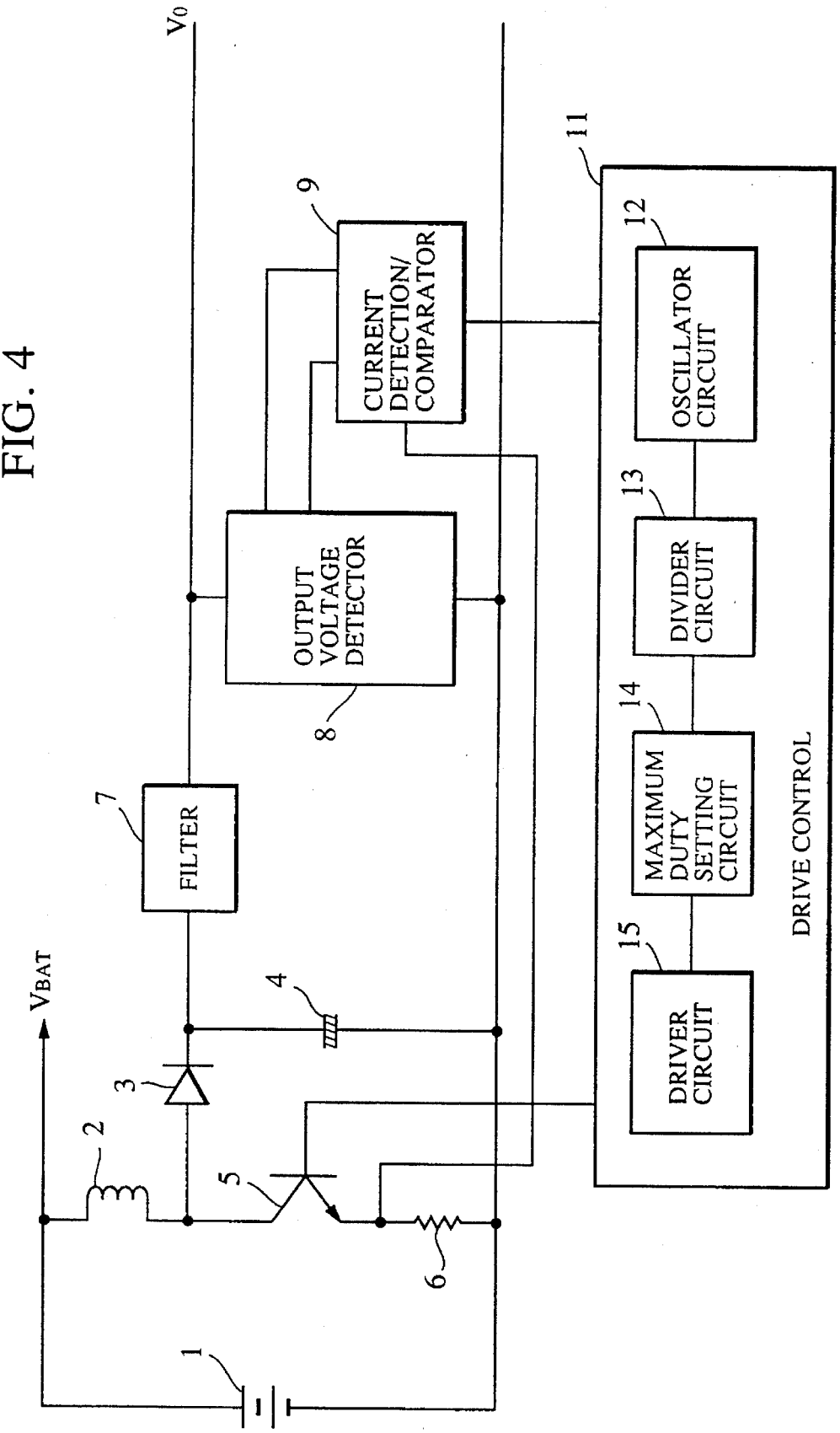
FIG. 4 is a block diagram of a DC-DC converter in accordance with another embodiment of the present invention.

FIG. 4 is a block diagram of a DC-DC converter in accordance with a second embodiment of the present invention, showing essential features of the invention. The DC-DC converter has a battery 1, i.e., a power source, a coil 2 having a predetermined inductance and having one end connected to the battery 1, a reverse current checking diode 3 connected to the other end of the coil 2, a capacitor 4 connected to the diode 3, a switching transistor 5 for switching a line connecting the coil 2 to ground, a resistor 6 for detecting a current flowing through the switching transistor 5, a filter 7 connected to the diode 3 and the capacitor 4 to smooth an output voltage $V_0$, an output voltage detector 8 for detecting the output voltage $V_0$, and a current detection/comparator 9 which receives a signal from the output voltage detector 8, which converts the difference between a target output voltage and the actual output voltage into a maximum allowable current and which determines whether or not the output from the current detection resistor 6 is larger than the maximum allowable current, and a drive control 11 including a DC-DC converter oscillator circuit 12, a divider circuit 13, a circuit 14 for setting a maximum duty, and a driver circuit 15 for directly driving the switching transistor 5.

An example of the operation of the thus-constructed DC-DC converter will be described with reference to the flowchart of FIG. 5. A start switch (not shown) of the DC-DC converter is turned on to start the operation of the DC-DC converter (S201) and the oscillator circuit 12 in the drive control 11 starts oscillating (S202). Then the switching transistor 5 is turned on by the driver circuit 15 in response to an output from the oscillator circuit 12 supplied to the driver circuit 15 through the divider circuit 13 and the maximum duty setting circuit 14 (S203). Simultaneously, a detection is made by the output voltage detector 8 as to whether the output voltage $V_0$ of the DC-DC converter has exceeded a predetermined voltage (S204). If the output voltage $V_0$ is equal to or lower than the predetermined voltage, that is, at a time immediately after the start of the DC-DC converter, the maximum allowable rush current with respect to the present output voltage is set to infinity according to the output from the output voltage detector 8 in the current detection/comparator, or the operation of the comparator, i.e., the operation of steps S205 and S206 is inhibited and the process proceeds to step S212. The drive control 11 maintains the on state of the switching transistor 5 for a maximum on-time determined by the maximum duty setting circuit 14 (S212).

In this state, as a current I flowing through the coil, a rush current flows generally in accordance with the equation (1).

After the elapse of the maximum on-time (S212), the switching transistor 5 is turned off by the driver circuit 15 (S208). Then the coil 2 produces a current so that a current flows to the capacitor 4 through the diode 3. The output voltage is thereby increased slightly.

After the elapse of an off-time predetermined by the maximum duty setting circuit 14 (S209), if the DC-DC converter is to successively continue operating (S210), the switching transistor 5 is turned on again (S203). A detection is again made by the output voltage detection circuit 8 as to whether the output voltage is higher than the predetermined voltage (S204). If the predetermined voltage is not exceeded, the same operation is repeated.

With several cycles of this operation, the output voltage $V_0$ is gradually increased. The output voltage detection circuit 8 detects whether the output voltage is higher than the predetermined voltage (S204). If the predetermined voltage is exceeded, the process then proceeds to step S205. In step S205, the difference between the present output voltage $V_0$ and the predetermined voltage and the difference between a set target voltage and the predetermined voltage are obtained by the current detection/comparator 9, and a maximum allowable rush current value is set according to these differences (S205). That is, the maximum allowable rush current is reduced only when the output voltage is higher than the predetermined voltage. This setting of the maximum allowable rush current will be described below with reference to FIG. 6. The maximum allowable rush current and the coil current are compared (S206). If the coil current is smaller than the maximum allowable rush current, the process proceeds to step S207 and a determination is made as to whether the present time is within the maximum on-time set by the maximum duty setting circuit 14 (S207). If the present time is within the maximum on-time, the coil current and the maximum allowable rush current are compared again (S206). Since the coil current is proportional to $t_{ON}$ as expressed by the equation (1), it is gradually increased as this operation is repeated. If the coil current exceeds the maximum allowable rush current value (S206) or if the maximum on-time has elapsed while the maximum allowable rush current is not exceeded (S207), the switching transistor 5 is turned off (S208). Subsequently, the same operation is repeated.

As the output voltage approaches the set target voltage, the maximum allowable rush current value becomes smaller. Accordingly, before the elapse of the maximum on-time (S207), the coil current exceeds the maximum allowable rush current value (S206), and the switching transistor 5 is turned off by the corresponding signal.

Figure 6:
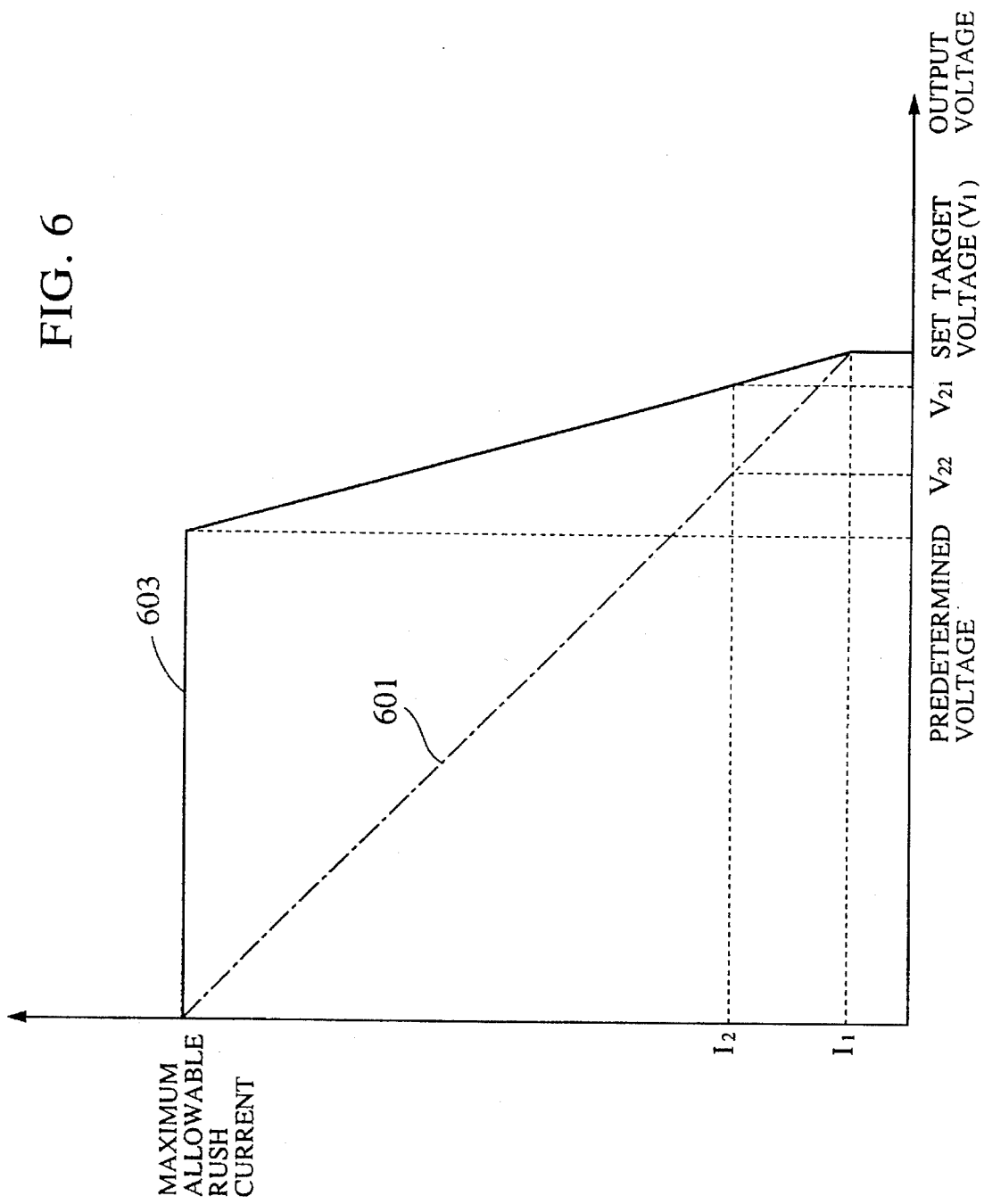
FIG. 6 is a diagram showing a correlation in accordance with the operation shown in FIG. 4.

FIG. 6 shows the relationship between the maximum allowable rush current of the current detection/comparator and the output voltage in accordance with the present invention.

The dot-dash line 601 in FIG. 6 represents a correlation line of the conventional current mode type DC-DC converter, while the solid line 603 represents a correlation line of the present invention. Before the predetermined voltage is reached, the current mode DC-DC converter control is not performed, as can be understood from this relationship diagram, and the maximum coil current therefore flows as the current expressed by the equation (1). Accordingly, the current caused when the switching transistor 5 is turned off is larger than that in the conventional current mode type DC-DC converter, so that the desired output level can be reached rapidly.

Figure 5:
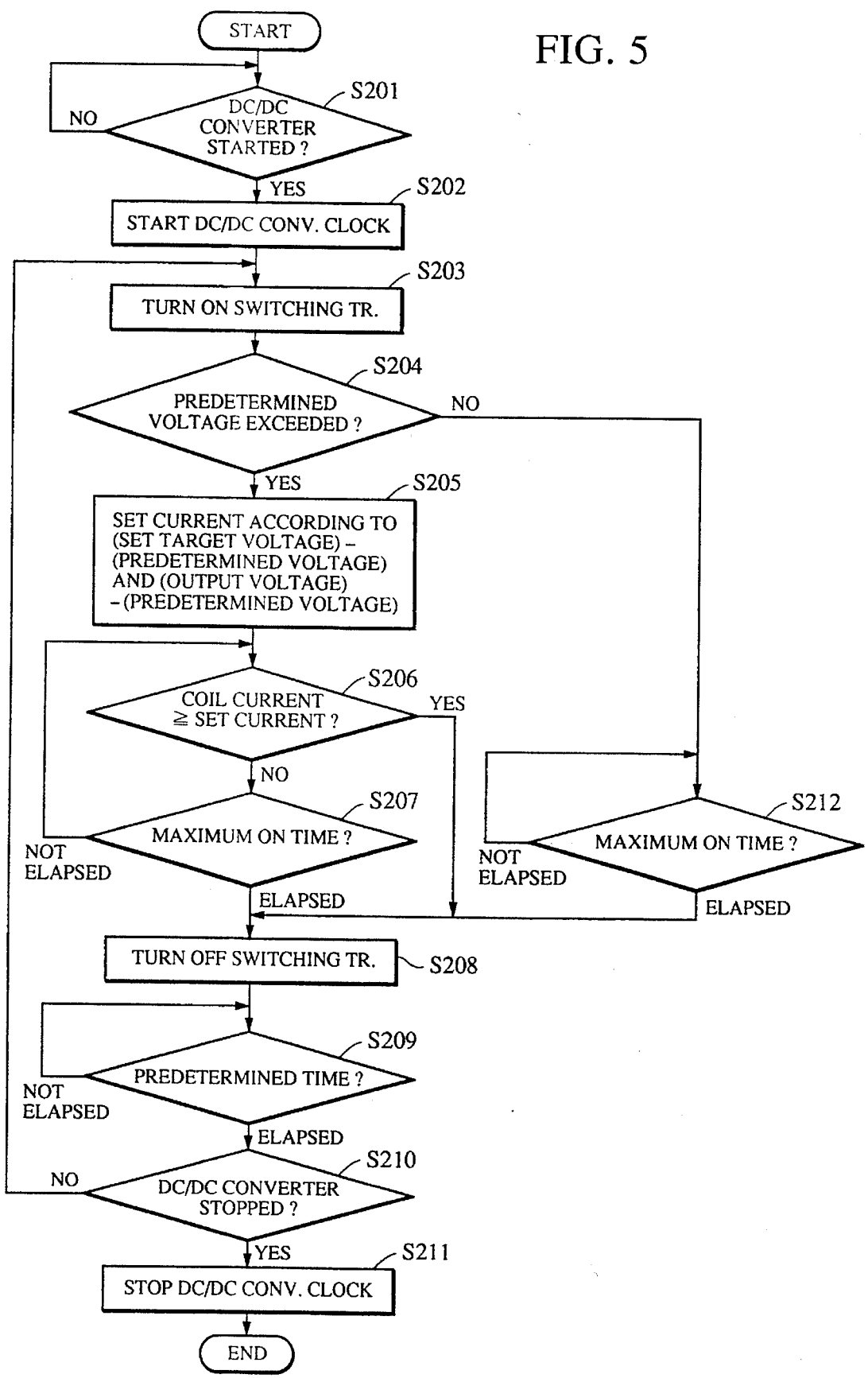
FIG. 5 is a flowchart of an example of the operation of the DC-DC converter shown in FIG. 4.

When the output voltage becomes higher than the predetermined voltage, the maximum allowable rush current is determined in step S205 of FIG. 5 and is therefore smaller than the coil current during the maximum on-time.

That is (set target voltage—predetermined voltage=$X_1$) and (output voltage—predetermined voltage=$X_2$) are obtained and the maximum allowable rush current is determined, for example, according to the ratio of $X_1$ and $X_2$ so as to be set to the current value during the maximum on-time when $X_2=0$ and so as to become smaller as $X_2$ approaches $X_1$.

By the effect of this arrangement, the DC-DC converter of the present invention has a higher gain, can respond quickly to a change in load and can maintain the output voltage generally constantly even if the load changes, thus being improved in regulation characteristic in comparison with the conventional current mode DC-DC converter. That is, when the load current I changes from $I_1$ to $I_2$, the output voltage only drops from $V_1$ to $V_{21}$ in the DC-DC converter of the present invention, while the output voltage drops from $V_1$ to $V_{22}$ in the conventional DC-DC converter. Also, the operation can be finely controlled with respect to the load current in the DC-DC converter of the present invention, which effect has been recognized as an advantage of the conventional current mode DC-DC converter. It is therefore possible to effectively reduce ripples or to use only simple and low-priced filters.

Figure 7:
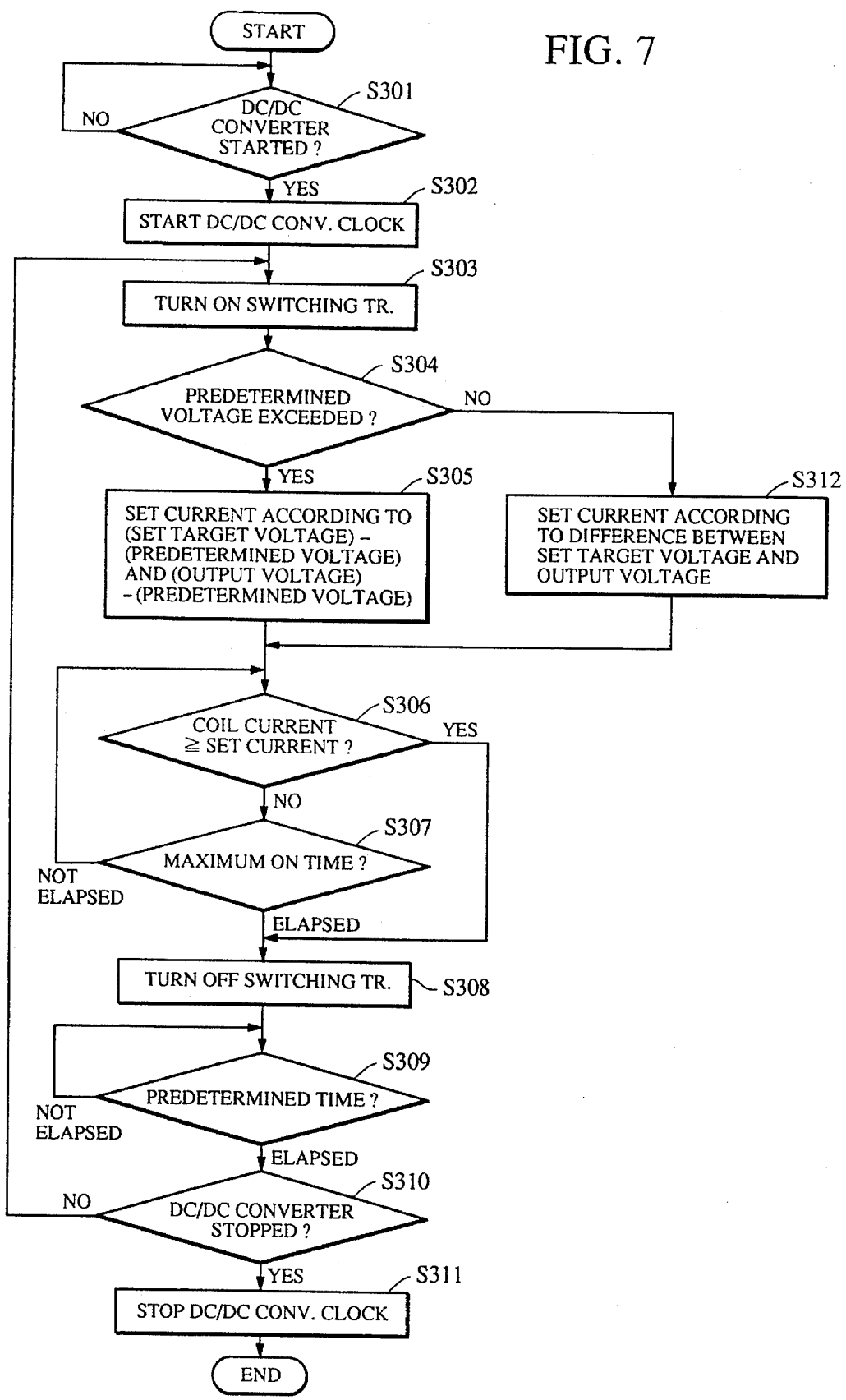
FIG. 7 is a flowchart of another example of the operation of the DC-DC converter shown in FIG. 4

FIG. 7 shows another example of the operation of the DC-DC converter arranged as shown in FIG. 4. A start switch (not shown) of the DC-DC converter is turned on to start the operation of the DC-DC converter (S301) and the oscillator circuit 12 in the drive control means 11 starts oscillating (S302). Then the switching transistor 5 is turned on by the driver circuit 15 in response to an output from the oscillator circuit 12 supplied to the driver circuit 15 through the divider circuit 13 and the maximum duty setting circuit 14 (S303). Simultaneously, a detection is made by the output voltage detector 8 as to whether the output voltage $V_0$ of the DC-DC converter has exceeded a predetermined voltage (S304). If the output voltage $V_0$ is equal to or lower than the predetermined voltage, that is, at a time immediately after the start of the DC-DC converter, a maximum allowable rush current is set according to the difference between the present output voltage and a set target voltage or another set voltage by using the output from the output voltage detector 8 in the current detection/comparator (S312).

On the other hand, as a current I flowing through the coil, a rush current flows generally in accordance with the equation (1).

This coil current and the maximum allowable rush current are compared (S306). If the coil current is smaller than the maximum rush current, the process proceeds to step S307 and a determination is made as to whether the present time is within a maximum on-time determined by the maximum duty setting circuit 14 (S307). If the present time is within the maximum on-time, the coil current and the maximum allowable rush current are compared again (S306). Since the coil current is proportional to $t_{ON}$ as expressed by the equation (1), it is gradually increased as this operation is repeated. If the coil current exceeds the maximum allowable rush current value (S306) or if the maximum on-time has elapsed while the maximum allowable rush current is not exceeded (S307), the switching transistor 5 is turned off (S308). When the switching transistor 5 is turned off, the coil 2 produces a current so that a current flows to the capacitor 4 through the diode 3. The output voltage is thereby increased slightly.

After the elapse of an off-time predetermined by the maximum duty setting circuit 14 (S309), if the DC-DC converter is to successively continue operating (S310), the switching transistor 5 is turned on again (S303). A detection is again made by the output voltage detection circuit 8 as to whether the output voltage is higher than the predetermined voltage (S304). If the predetermined voltage is not exceeded, the same operation is repeated.

With several cycles of this operation, the output voltage $V_0$ is gradually increased. The output voltage detection circuit 8 detects whether the output voltage is higher than the predetermined voltage (S304). If the predetermined voltage is exceeded, the process then proceeds to step S305. In step S305, the difference between the present output voltage $V_0$ and the predetermined voltage and the difference between the set target voltage and the predetermined voltage are obtained, and a maximum allowable rush current value is set in the same manner as in step S205 of FIG. 5 (S305). That is, when the output voltage becomes larger than the predetermined voltage, a feedback gain is increased so that the maximum allowable rush current at the present output voltage is larger than the maximum allowable current at the output voltage not higher than the predetermined voltage. Subsequently, this current and the coil current are compared (S306). When coil current becomes larger than the maximum allowable rush current or after the elapse of the maximum on-time (S307), the switching transistor 5 is turned off (S308). Subsequently, the same operation is repeated. As the output voltage approaches the set target voltage, the maximum allowable current becomes smaller and the coil current also becomes smaller simultaneously.

Figure 8:
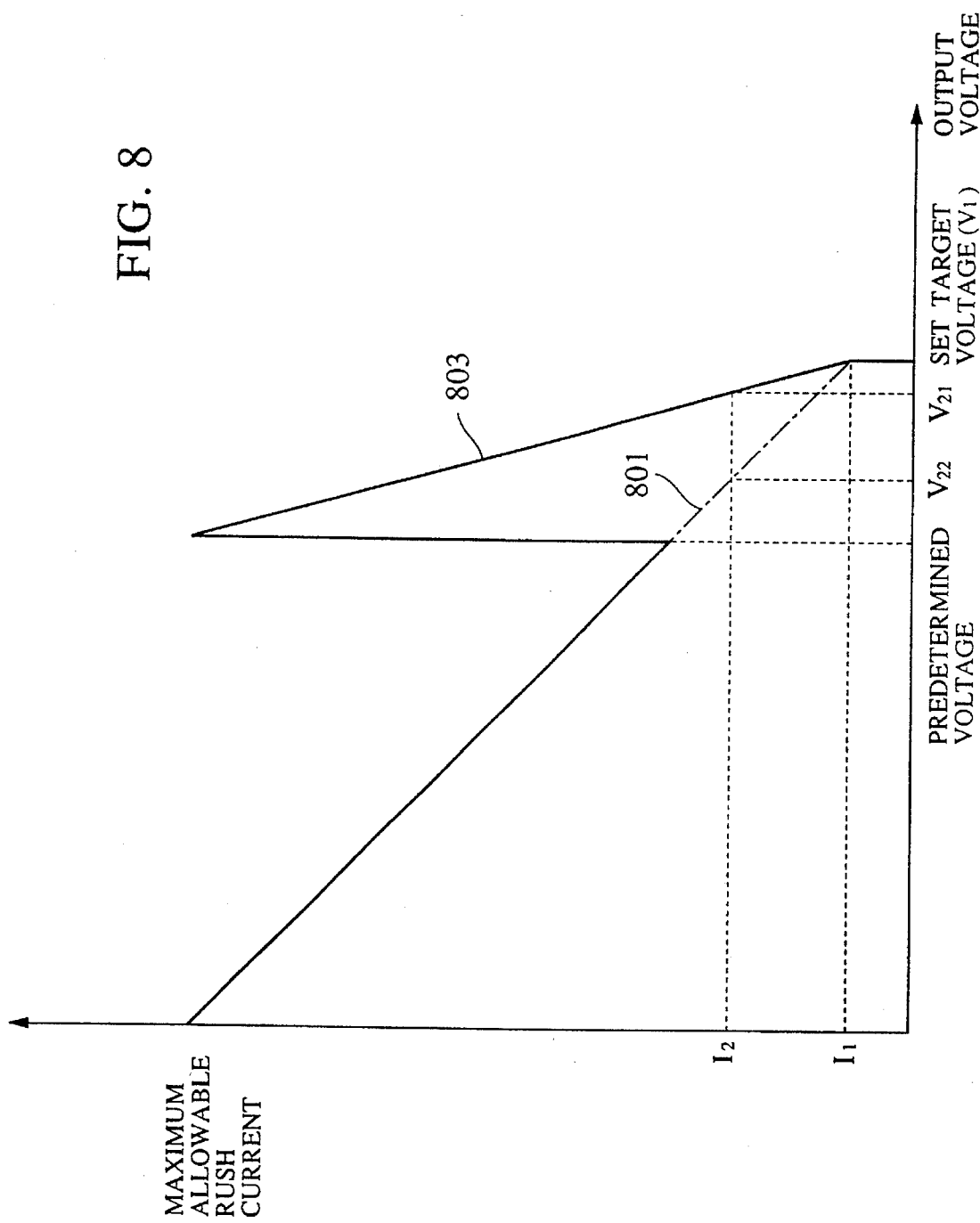
FIG. 8 is a diagram showing a correlation in accordance with the operation shown in FIG. 7.

FIG. 8 shows the relationship between the maximum allowable rush current of the current detection/comparator and the output voltage in the case of the operation shown in FIG. 7.

The dot-dash line 801 in FIG. 8 represents a correlation line of the conventional current mode type DC-DC converter, while the solid line 803 represents a correlation line of the present invention. Before the predetermined voltage is reached, the operation of the conventional current-mode DC-DC converter is performed, as can be understood from this relationship diagram. When the predetermined voltage is exceeded, a different feedback gain is set and the maximum allowable rush current becomes high again. Accordingly, in comparison with the conventional current mode DC-DC converter, the DC-DC converter of the present invention can respond more quickly to a change in load, can maintain the output voltage generally constant even if the load changes, and therefore has an improved regulation characteristic. That is, when the load current I changes from $I_1$ to $I_2$, the output voltage only drops from $V_1$ to $V_{21}$ in the DC-DC converter of the present invention, while the output voltage drops from $V_1$ to $V_{22}$ in the conventional DC-DC converter. Also, the operation can be finely controlled with respect to the load current in the DC-DC converter of the present invention, which effect has been recognized as an advantage of the conventional current mode DC-DC converter. It is therefore possible to effectively reduce ripples or to use only simple and low-priced filters.

Figure 9:
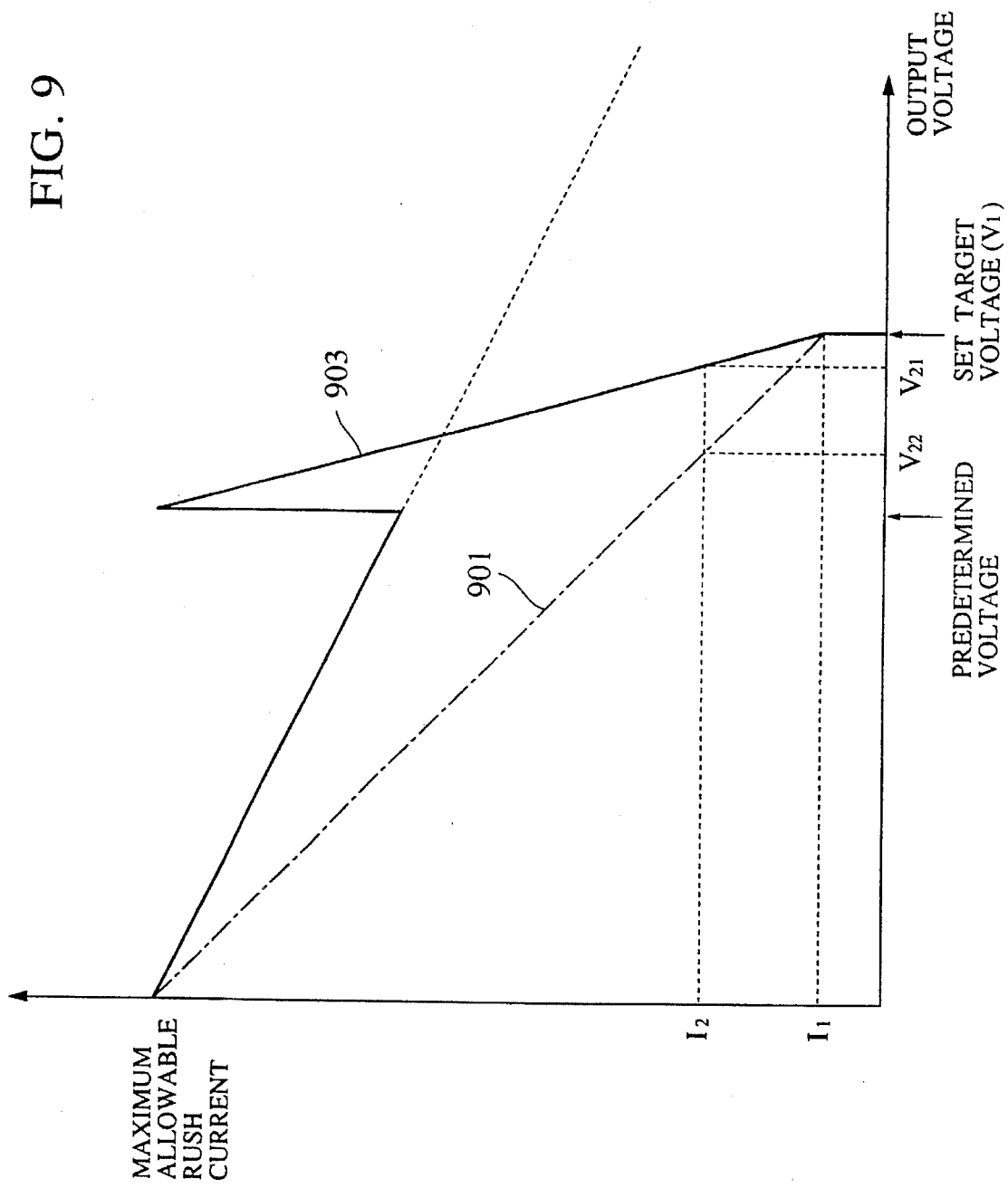
FIG. 9 is a diagram showing another correlation in accordance with the operation shown in FIG. 7.
Figure 10:
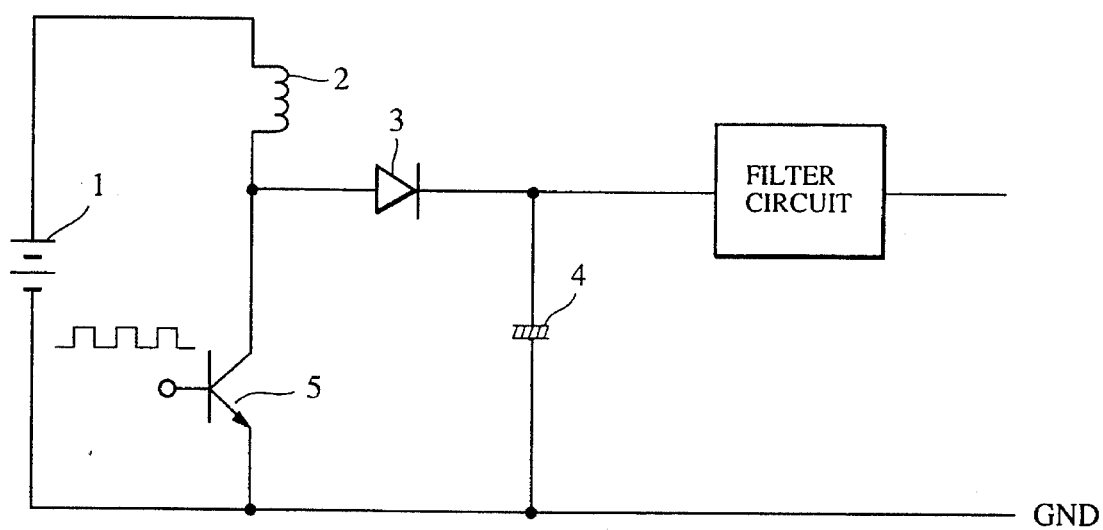
FIG. 10 is a block diagram of a conventional DC-DC converter.

FIG. 9 shows another example of the relationship between the maximum allowable rush current of the current detection/comparison means and the output voltage shown in FIG. 8. The dot-dash line 901 represents a correlation line of the conventional current mode type DC-DC converter while the solid line 903 represents a correlation line of the present invention.

The control shown in FIG. 9 differs from that shown in FIG. 8 in that the feedback gain at a range below the predetermined voltage is increased. That is, a maximum allowable current is set according to the difference between the present output voltage and another set voltage higher than the set target voltage. The DC-DC converter of the present invention therefore has an advantage of being faster in starting than the conventional current mode DC-DC converter.

While the present invention has been described with respect to what presently are considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A DC-DC converter having switching means for switching a current flowing through a coil which flows in accordance with a standard clock signal provided from outside, and in which an output voltage is controlled by controlling a current flow through said coil by said switching means, said DC-DC converter comprising:

a maximum duty setting circuit which limits the maximum on time during one cycle of switching operation of said switching means;

a detection circuit for detecting said output voltage;

a current control circuit for limiting the current flowing through said coil in accordance with said output voltage; and a control circuit for controlling the duty of the switching operation of said switching means in accordance with the current flowing limited by said current control circuit when said detected output is larger than a predetermined value, and for performing a switching operation of the switching means in the maximum on time controlled by said maximum duty setting circuit when the output detected by said detection circuit is as much as, or smaller than the predetermined value.

2. A DC-DC converter according to claim 1, wherein said current control circuit limits a current flow to be smaller, as said output voltage is larger.

3. A DC-DC converter according to claim 2, wherein said current control circuit limits a current flow in accordance with a difference between said output voltage and a targeted voltage.

4. A DC-DC converter according to claim 2, wherein said current control circuit limits a current flow in accordance with a difference between said output voltage and said predetermined value and a difference between a targeted voltage and said predetermined value.

5. A DC-DC converter having switching means for switching a current flowing through a coil which flows in accordance with a standard clock signal provided from outside, and in which an output voltage is controlled by controlling a current flow through said coil by said switching means, said DC-DC converter comprising:

a detection circuit for detecting said output voltage;

a current flow control circuit for limiting the current flow through said coil in accordance with said output voltage, wherein said circuit limits the current flow in a first relation to the output voltage when the output detected by said detection circuit is within a first range of output, and in a second relation which is different from the first relation, to the output voltage when the detected output is within a second range of output; and a control circuit for controlling the duty of a switching operation of said switching means in accordance with the current flow limited by said current control circuit.

6. A DC-DC converter according to claim 5, wherein said first relation is a relation which limits the current flow in accordance with a difference between said output voltage and a targeted voltage, and said second relation is a relation which limits the current flow in accordance with a difference between a targeted voltage and a predetermined value and a difference between the output voltage and said predetermined value.

* * * * *

UNITED STATES PATENT AND TRADEMARK OFFICE
CERTIFICATE OF CORRECTION

PATENT NO. : 5,598,092
DATED : January 28, 1997
INVENTOR(S) : Masanori OHTSUKA, et al.

It is certified that error appears in the above-indentified patent and that said Letters Patent is hereby corrected as shown below:

COLUMN 3

Line 6, "FIG. 4" should read --FIG. 4;--.

Signed and Sealed this

First Day of July, 1997

Attest:

BRUCE LEHMAN

Attesting Officer          Commissioner of Patents and Trademarks